July 10, 1945.　　　　E. C. PLANETT　　　　2,380,071

WELDING BAND FOR PIPE JOINTS

Filed April 3, 1943

EARL C. PLANETT,
INVENTOR.

BY Oscar A. Mellin
ATTORNEY.

Patented July 10, 1945

2,380,071

UNITED STATES PATENT OFFICE 2,380,071

WELDING BAND FOR PIPE JOINTS

Earl C. Planett, Downey, Calif.

Application April 3, 1943, Serial No. 481,757

1 Claim. (Cl. 285—111)

This invention relates to welding bands for use in butt-welding pipe sections together.

It is the principal object of my present invention to provide an improved welding band for pipe which will materially reduce the amount of welding rod used; reduce the amount of welding time necessary to effect a proper butt weld between pipe sections and which will insure that no slag or molten metal will enter the interior of the pipe at the welded joint during welding.

In practicing my invention, I provide a circular flat spring band of a diameter that it may telescope into the ends of adjoining pipe sections and align the same. Mounted circumferentially and centrally upon this band is a ring formed of metal having a melting point approximately of the same as welding rod. The pipe ends tightly abut against this ring when telescoped over the band. The operator then applies heat to puddle the ring and adds sufficient rod to form a proper weld the full depth of the pipe wall. The band resists burning through during the welding, and thus prevents slag from entering the pipe.

One form which my invention may assume is exemplified in the following description, and illustrated by way of example in the accompanying drawing, in which.

Referring more particularly to the accompanying drawing, 10 and 11 indicate the abutting ends of two sections of pipe to be joined by welding. Telescoped within these ends is a welding band 12 formed of sheet metal having a certain amount of inherent spring qualities. The band 12 is circular in form and its ends stop short of each other so as to form a gap 12a. Ordinarily the band 12 is of an external diameter slightly larger than the interior diameter of the pipe to which it is to be fitted so that it is slightly under compression when telescoped into the pipe. This enables the inherent spring qualities of the band to cause it to tightly grip the pipe so that it will not easily become dislodged. Even when fitted to the pipe, however, the gap 12a is not entirely closed so that the band may expand when heated without buckling.

Figure 1:
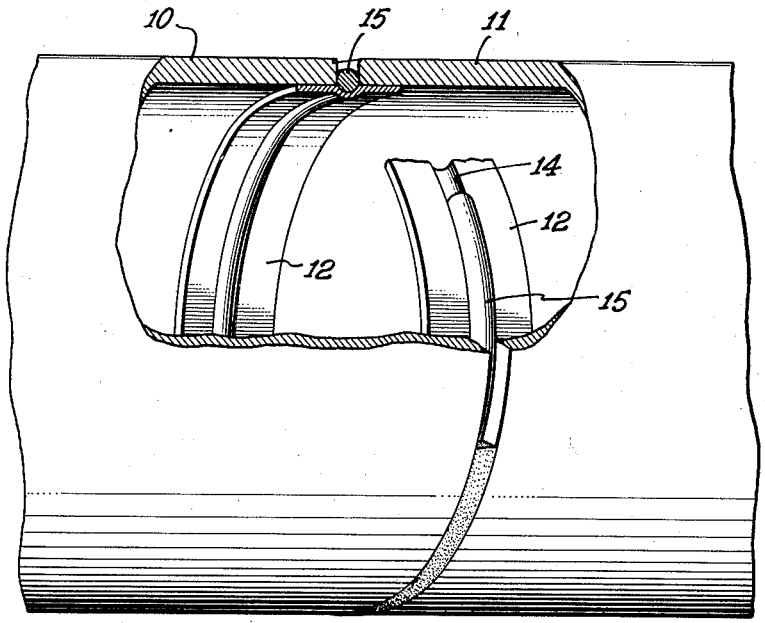
Fig. 1 is a perspective view partly in elevation and partly in section showing my improved welding band and the manner of its application and use.
Figure 2:
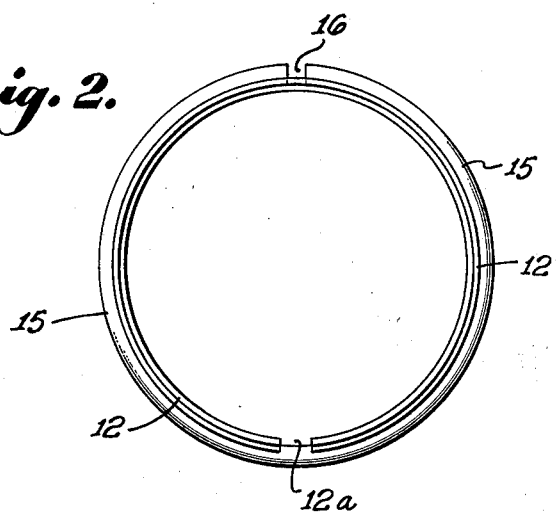
Fig. 2 is an end view of the welding band.
Figure 3:
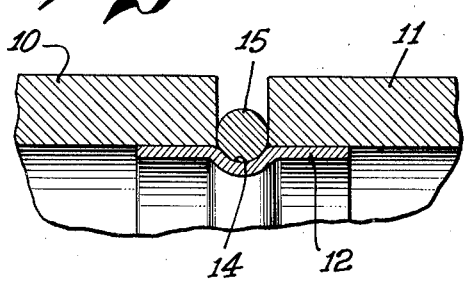
Fig. 3 is a cross-sectional view of the band showing the manner in which it is applied to adjoining ends of pipe sections.

Formed circumferentially and centrally of the band is a slight groove or scoring 14 which is adapted to receive a spacer ring 15. This ring 15 is round in cross-section and of a diameter equal to the space it is desired to maintain between the adjacent pipe ends for welding. Further, this ring 15 is of material of an analysis and a melting point approximately the same as that of welding rod. The ends of the ring 15 also extend short of each other so that a gap 16 occurs between its ends as illustrated in Fig. 2. The gaps 12a and 16 are relatively circumferentially offset as illustrated so that no gap extends entirely through the band to enable slag to penetrate into the interior of the pipe during welding.

I prefer that the ring 15 be spot-welded to the band 12, but this is not entirely necessary as one can rely, if one so desires, upon the nesting of the ring 15 on the circumferential scoring 14 in the band 12 for this purpose.

In use of the device, it is slightly compressed and inserted into the end of one pipe section, until the ring 15 abuts against the end of this section. Then the other pipe section is drawn over the projecting portion of the band 15 until its end also abuts against the ring 15. Obviously, the ring 15 in such case acts as a spacing element to provide the proper spacing between the contiguous pipe ends for welding purposes.

It is obvious that the band 12 forms a convenient member for properly aligning the abutting ends of the pipe and maintaining them in aligned condition for welding. While so aligned, the welder puddles the ring 15 and adds sufficient rod so that a proper weld is effected between the pipe ends for the full thickness of the pipe wall. In that the ring 15 is approximately the same analysis of the welding rod a good weld will be effected with the use of a minimum of welding rod and with a minimum of welding time expended.

Due to the fact that the band 12 will readily transmit heat and radiate the same it will not burn through, and consequently will prevent penetration of slag into the pipe at the joint. It is also seen that inasmuch as the gap 16 and 12a of the ring 15 and band 12 are relatively offset, expansion is provided for without leaving any opening in alignment with the space between the pipe ends through which slag or molten metal may penetrate into the pipe at the joint.

From the foregoing it is obvious that I have provided a very simple welding band which may be used in aligning and properly spacing the ends of pipe sections for welding and which, because it provides a filler in the seam, minimizes the amount of welding rod and welding time necessary to effect a weld.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

As an article of manufacture, a heat transmitting and radiating welding band comprising a circular band of flat cross-section, said band having a groove formed in its exterior surface and extending circumferentially about the same and centrally thereof, a ring of fusible metal and of circular cross-section and of a diameter considerably less than the width of the band and mounted circumferentially and centrally of the band and nesting in said groove, the ends of said band being spaced apart, the ends of said ring being spaced apart, the spacing between the band ends and ring ends being spaced apart circumferentially.

EARL C. PLANETT.